United States Patent [19]

Meltzer et al.

[11] Patent Number: 5,382,645

[45] Date of Patent: Jan. 17, 1995

[54] PROCESS FOR THE PREPARATION OF CROSSLINKED POLY(ISOCYANATES)

[75] Inventors: Aaron D. Meltzer, Carnegie; Harald Pielartzik, Pittsburgh, both of Pa.

[73] Assignee: Miles Inc., Pittsburgh, Pa.

[21] Appl. No.: 127,917

[22] Filed: Sep. 28, 1993

[51] Int. Cl.$^6$ ............................................. C08G 18/02
[52] U.S. Cl. ........................................ 528/45; 528/49; 525/452
[58] Field of Search ...................... 528/44, 45, 48, 49; 525/452

[56] References Cited

U.S. PATENT DOCUMENTS

| | | |
|---|---|---|
| 2,965,614 | 12/1960 | Shashoua . |
| 4,111,914 | 9/1978 | Kresta et al. ............... 528/48 |
| 4,224,431 | 9/1990 | Heiss ......................... 528/48 |
| 4,250,106 | 2/1981 | Heiss . |

Primary Examiner—John Kight, III
Assistant Examiner—John M. Cooney, Jr.
Attorney, Agent, or Firm—Joseph C. Gil; Aron Preis

[57] ABSTRACT

A composition suitable for making coatings, binders and films and the process for the preparation of the composition are disclosed. Accordingly, nylon-1 which contains structural units conforming to

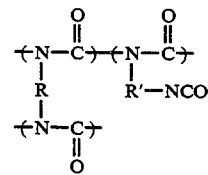

where R and R' are organic radicals, and which contains an amount of unpolymerized NCO groups, is reacted with a monofunctional blocking agent to produce a first product. The resulting first product is then reacted with an isocyanate-reactive product to produce a second product. The second product is suitable for the preparation of films, binders and coatings.

18 Claims, No Drawings

PROCESS FOR THE PREPARATION OF CROSSLINKED POLY(ISOCYANATES)

FIELD OF THE INVENTION

The invention relates to a thermoset composition and more particularly to a composition based on a highly cross-linked nylon-1.

SUMMARY OF THE INVENTION

A composition suitable for making coatings and films and the process for the preparation of the composition are disclosed. Accordingly, nylon-1 which contains structural units conforming to

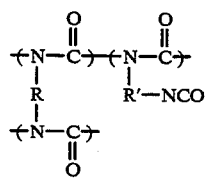

where R and R' are organic radicals, and which contains an amount of unpolymerized NCO groups, is reacted with a monofunctional blocking agent to produce a first product. The resulting first product is then reacted with an isocyanate-reactive product to produce a second product. The second product is suitable for the preparation of thermosetting films, binders and coatings.

BACKGROUND OF THE INVENTION

The preparation of thermosetting materials such as coatings and binders by reacting a blocked isocyanate with a polyol is well known in the art. A large variety of coatings based on this technology has been disclosed in the patent literature. Linear, heterocyclic nylon-1 polymers have been disclosed in U.S. Pat. Nos. 4,224,431 and 4,250,106. The use of the linear system as a blocked diisocyanate for the production of polyurethane useful as binder for paints and coatings has thus been disclosed.

A co-pending U.S. patent application, Ser. No. 07/970,670, filed Nov. 3, 1992, now abandoned discloses the preparation of a thermosetting composition by reacting (i) a highly cross-linked nylon-1 which contains structural units conforming to

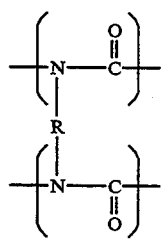

where R is an organic radical, with (ii) an isocyanate-reactive compound, at a particular molar ratio therebetween. The reaction products include coatings, binders and potting compounds.

DETAILED DESCRIPTION OF THE INVENTION

It has now been discovered that improved products, including films, binders and coatings may be prepared on the basis of the previously disclosed cross-linked nylon-1 by blocking the unreacted isocyanates with monofunctional compounds, such as traditional blocking agents.

The preparation of nylon-1 which is suitable in the present context has been disclosed in the co-pending patent application Ser. No. 07/970,670 filed Nov. 3, 1992. Essentially, the highly crosslinked nylon-1 polymer is formed by the anionic or coordination polymerization of polyfunctional isocyanate monomers or adducts.

The polyisocyanates suitable for use in the preparation of nylon-1 include the known polyisocyanates of polyurethane chemistry. Examples include those having aliphatically or cycloaliphatically bound isocyanate groups such as hexamethylene diisocyanate, 2,2,4- and-/or 2,4,4-trimethyl-1,6-hexamethylene diisocyanate, dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 1,3- and 1,4-bis(isocyanatomethyl)-cyclohexane, bis-(4-isocyanato-3-methyl-cyclohexyl)-methane, xylylene diisocyanate, $\alpha,\alpha,\alpha',\alpha'$-tetramethyl-1,3- and/or-1,4-xylylene diisocyanate, 1-isocyanato-1-methyl-4(3)-isocyanatomethyl cyclohexane, and 2,4- and/or 2,6-hexahydrotoluylene diisocyanate. Also suitable though less preferred are aromatic polyisocyanates such as 2,4- and/or 4,4'-diisocyanatodiphenyl methane and mixtures of these isomers with their higher homologues which are obtained in known manner by the phosgenation of aniline/formaldehyde condensates, 2,4-and/or 2,6-diisocyanato-toluene and mixtures of these compounds.

Also suitable are derivatives of monomeric polyisocyanates including polyisocyanates which contain biuret groups as described, for example, in U.S. Pat. Nos. 3,124,605, 3,201,372 and DE-OS 1,101,394; polyisocyanates which contain isocyanurate groups as described, for example, in U.S. Pat. No. 3,001,973, DE-PS 1,022,789, 1,222,067 and 1,027,394 and DE-OS 1,929,034 and 2,004,048; polyisocyanates which contain uretdione groups and prepared by oligomerizing a portion of the isocyanate groups of a diisocyanate in the presence of a trialkyl phosphine catalyst; polyisocyanates which contain oxadiazinetrione groups and containing the reaction product of two moles of a diisocyanate and one mole of carbon dioxide; polyisocyanates containing urethane groups as described, for example, in DE-OS 953,012, BE-PS 752,261 and U.S. Pat. No. 3,394,164 and 3,644,457; polyisocyanates containing carbodiimide groups as described in DE-PS 1,092,007, U.S. Pat. No. 3,152,162 and DE-OS 2,504,400, 2,537,685 and 2,552,350; polyisocyanates containing allophanate groups as described, for example, in GB-PS 994,890, BE-PS 761,626 and NL-OS 7,102,524; and polyisocyanates containing allophanate and isocyanurate groups, the disclosures of all of the above documents are herein incorporated by reference.

A useful system containing nylon-1 and an isocyanate-reactive compound cures upon heating to yield a product, for instance a coating.

Desirable properties characterize the coating thus prepared. The lowered content of volatilizable compounds is believed to contribute to the improved properties of the products thus prepared.

Characteristically, a significant amount, about 1 to as much as 49%, more specifically about 15 to 25%, of the NCO groups do not polymerize in the course of the preparation of nylon-1. The presence of the unreacted NCO groups poses a health hazard and may adversely effect the properties of the resulting film made therefrom.

In accordance with the present invention isocyanate-based products, including coatings and films are prepared by
(i) reacting a highly cross-linked nylon-1 having a residual isocyanate functionality with a monofunctional compound to produce a first product, and
(ii) reacting, optionally in the presence of a catalyst, said first product with a suitable isocyanate-reactive compound, for instance polyol or polyamines to produce a second product.

The second product is suitable for fabricating into films, binders and coatings. In the application the film, binder or the coating thus prepared are then thermally cured.

Nylon-1 in the present context is formed by the anionic or coordination polymerization of polyfunctional isocyanate monomers or adducts. Structurally, nylon-1 may be described as conforming to

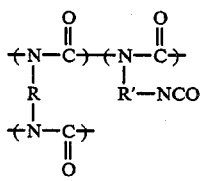

where R and R' independently are organic radicals denote linear hydrocarbon groups. More preferably R and R' independently are $C_{4-25}$ divalent hydrocarbon groups, $C_{5-15}$ divalent cyclo-aliphatic hydrocarbon groups, $C_{7-15}$ divalent araliphatic hydrocarbon groups or $C_{6-15}$ divalent aromatic hydrocarbon groups. R and R' independently may contain additional functional groups such as uretdione, biuret or allophanate. The repeat units are presented in parentheses.

The highly cross-linked nylon-1 polymer entailed in the present invention is insoluble in any of the conventional solvents for polyisocyantes and is characterized in that at least 50% of its amide repeat units are cross-linking sites and in that it contains about 1 to 49%, more especially about 15 to 25%, of unpolymerized NCO groups.

In accordance with the present invention the nylon-1 thus prepared is first reacted with a blocking agent or with a compound that irreversibly reacts with an isocyanate to produce a first product. Suitable blocking agents are known mono-functional blocking agents for isocyanates. Examples include monophenols such as phenol, the cresols, the trimethyl phenols and the ted butyl phenols; tertiary alcohols such as tertiary butanol, tertiary amyl alcohol and dimethylphenyl carbonyl; compounds which easily form enols such as acetoacetic ester, acetyl acetone and malonic acid derivatives, e.g., malonic acid diethylester; secondary aromatic amines such N-methylaniline, the N-methyl toluidines, N-phenyl toluidine and N-phenyl xylidene; imides such as succinimide; lactams such as ε-caprolactam and γ-valerolactam; oximes such as acetone oxime, butanone oxime and cyclohexanone oxime; mercaptans such as methylmercaptan, ethyl mercaptan, butyl mercaptan, 2-mercapto-benzothiazole, α-napthyl mercaptan or β-naphthyl mercaptan and dodecyl mercaptan; and triazoles such as 1H-1,2,4-triazole. Preferred blocking agents are acetone oxime and especially ε-caprolactam. Other suitable reactants include amines, carboxylic acids, water, carbodiimides, phosphoranes and bisulfites.

The amount of blocking agents to be reacted with the nylon-1 of the invention is determined by the content of the unreacted NCO groups which may be measured by standard analytical techniques. The reaction is carried out in an inert organic solvent.

The product of the reaction, first product, is further reacted in accordance with the invention with an organic compound containing two or more isocyanate-reactive functional groups. Functional groups in the present context are these groups which reacts with isocyanate upon heating to a temperature at which the nylon-1 decomposes. These isocyanate-reactive compounds may be used in their polymeric or monomeric forms. Examples of such functional groups include aliphatic hydroxy, phenols, as well as aliphatic and aromatic amines (primary and secondary), carboxylic anhydrides, carboxylic acids, ketimines and dienes. The polymeric forms are characterized in that their molecular weight is up to about 8000, preferably about 300 to 5000. Examples of the high molecular weight compounds are hydroxyl-terminated polyesters, polycarbonates, polyestercarbonates, polyethers, polyethercarbonates, polyacetals, polyamides, polyureas, polyurethanes, polyolefins, polyamines, polyacrylates, polybutadienes, polyesteramides, and polythioethers. Amino-functional polyethers, such as those described in U.S. Pat. No. 4,724,252 and German Offenlegungsschrift 3,713,858, as well as polyethers prepared by the amination of polyether polyols, such as the commercially available products sold under the registered trademark "Jeffamine", may also be used. The polyesters, polycarbonates and polyethers are preferred. The most suitable isocyanate-reactive compound in the context of the invention is a polyol.

Suitable polyester polyols having a functionality of two or more, include reaction products of dihydric or polyhydric alcohols and dibasic or polybasic carboxylic acids or their anhydrides. Instead of free dicarboxylic acids, the corresponding anhydrides or diesters of lower alcohols or mixtures thereof may be used for preparing the polyester. The carboxylic acids may be aliphatic, cycloaliphatic, aromatic and/or heterocyclic and they may be substituted, for example, by halogen atoms, and/or unsaturated. The following are mentioned as examples: succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrahydroisophthalic anhydride, hexahydroisophthalic anhydride, endomethylene tetrahydrophthalic anhydride, glutaric anhydride, maleic anhydride, maleic acid, fumaric acid, dimeric fatty acids such as oleic acid, and dimethyl terephthalate and mixed terephthalates. Suitable dihydric alcohols include ethylene glycol; 1,3- and 1,2-propylene glycol; 1,4-, 1,3- and 2,3-butylene glycol; 1,6-hexamethylene glycol; 1,8-octanediol; neopentyl glycol; cyclohexanedimethanol or 1,4-bis-(hydroxymethyl)-cyclohexane; 2-methyl-1,3-propanediol; 2,2,4-trimethyl-1,3-pentanediol; diethylene glycol; dipropylene glycol; triethylene glycol; tripropylene glycol; dibutylene glycol; polyethylene glycol;

polypropylene glycol; and polybutylene glycol. Suitable polyhydric alcohols include trimethylol propane, sucrose, manose, galactose and others. The polyesters may also contain a portion of carboxyl end groups. Polyesters of lactones, for example ε-caprolactone or hydroxycarboxylic acids, for example ω-hydroxycaproic acid, may also be used. Polycarbonates containing hydroxy groups include the products obtained from the reaction of diols such as 1,3-propanediol, 1,4-butanediol, 1,6-hexanediol, diethylene glycol, polyethylene glycol, polypropylene glycol and/or polytetramethylene glycol with phosgene, diaryl carbonates such as diphenylcarbonate or cyclic carbonates such as propylenecarbonate.

Suitable polyether polyols are obtained in known manner by the reaction of starling compounds which contain reactive hydrogen atoms with alkylene oxide such as ethylene oxide, propylene oxide, butylene oxide, styrene oxide, tetrahydrofuran, epichlorohydrin or with mixtures of these alkylene oxides.

Suitable starting compounds containing reactive hydrogen atoms include water, bisphenol A and the dihydric alcohols set forth for preparing the polyester polyols. Other compounds containing isocyanate reactive components suitable in the present context include the dihydric alcohols which have been described for the preparation of the polyester polyols; aminoalcohols such as N-methyl diethanolamine and aminoethanol; and diamines such as diaminoethane, 1,6-diaminohexane, piperazine, N,N'-bis(2-amino-ethyl) piperazine, 1-amino-3-aminomethyl-3,5,5-trimethyl-cyclohexane (isophorone diamine or IPDA), bis(4-aminocyclohexyl) methane, bis(4-amino-3-methylcyclohexyl) methane, 1,3- and 1,4- diamino-cyclohexane and 1,3-diaminopropane. Hydrazine, amino acid hydrazides, hydrazides of semi-carbazidocarboxylic acids, bis-(hydrazides) and bis-(semicarbazides) and the like may also be used.

In the preparation of the composition in accordance with the invention, nylon-1 and an isocyanate-reactive compound are reacted such that the molar ratio of the total of amide groups and blocked NCO groups and the remaining NCO groups, if any, to NCO-reactive groups is about 0.5:1 to 20:1, preferably 0.8:1 to 5:1.

The reaction may optionally be carried out in the presence of a catalyst. Suitable catalysts for the formation of urethanes are well known in the art. Among the suitable catalysts mention may be made of organo-tin catalysts and of titanium (IV) alkoxides.

The invention is further illustrated but is not intended to be limited by the following examples in which all parts and percentages are by weight unless otherwise specified.

EXAMPLES

1. Preparation of a catalyst

Trifluoroethanol (82.6 gram (gm), 0.83 mole) was placed in a dripping funnel, attached to a 250 ml 3-neck flask fitted with a condenser and an HCl trap. The reaction vessel was flushed with $N_2$ (g) and 100 ml of dry toluene were cannulated into the vessel. $TiCl_4$ (93.0 ml, 0.85 mole) was cannulated into the vessel. The alcohol was slowly added to the flask so as to control the evolution of HCl (g), and the reaction mixture turned orange. When the evolution of gas subsided, the reaction mixture was heated to 80° C. causing the reaction mixture to turn dark red and after the further evolution of HCl gas subsided, the reaction was allowed to cool to room temperature and stored under $N_2$(g).

2. Preparation of nylon-1 (a)

In a 1.0 liter, 3-neck flask there were placed 100 grams of Hexamethylenediisocyanate, HDI, and 500 ml of a solvent (hexane:xylene 35:65). The flask was fitted with a dripping funnel and a mechanical stirrer. The reaction vessel was flushed with $N_2$(g). The catalyst (31 ml, 4 m solution) was slowly added and the residual NCO determined (2%). IR was used to confirm the presence of amide bonds (1700 $cm^{-1}$).

3. Preparation of nylon-1 (b)

In a 1.0 liter, 3-neck flask there were placed 100 grams of Hexamethylenediisocyanate, HDI, and 500 ml of a solvent (hexane:xylene 35:65). The flask was fitted with a dripping funnel and a mechanical stirrer. The reaction vessel was flushed with $N_2$(g). The catalyst (28 ml, 4 m solution) was slowly added and the residual NCO determined (2%). Cresol (54.0 gram, 0.48 mol) was slowly added until the residual % NCO was nil. The stirrer was stopped, the system was allowed to settle and the excess solvent was decanted off. IR was used to confirm the presence of amide bonds (1700 $cm^{-1}$).

4. Preparation of nylon-1 (c)

In a 1.0 liter, 3-neck flask there were placed 100 grams of Hexamethylenediisocyanate, HDI, and 500 ml of a solvent (hexane:xylene 35:65). The flask was fitted with a dripping funnel and a mechanical stirrer. The reaction vessel was flushed with $N_2$(g). The catalyst (28 ml, 4 m solution) was slowly added and the residual NCO determined (2%). Methyl ethyl ketoxime (29.2 gram, 0.33 mol) was slowly added until the residual % NCO was nil. The stirrer was stopped, the system was allowed to settle and the excess solvent was decanted off. IR was used to confirm the presence of amide bonds (1700 $cm^{-}$).

5. (i) Preparation of films from nylon-1 (a)

Nylon-1 (a) (10 grams) was mixed with a catalytic amount of dibutyltindilaureate and 4 grams of dodecafunctional OH-terminated poly(hexamethylene adipate). The three components were thoroughly mixed and the mixture poured onto a glass plate and cured at 140° C. for 2 hours resulting in a lumpy material.

(ii) Preparation of films from nylon-1 (a)

Nylon-1 (a) (6.6 grams) was mixed with a catalytic amount of dibutyltindilaureate and 4 grams of difunctional OH-terminated poly(hexamethylene adipate). The three components were thoroughly mixed and the mixture poured onto a glass plate and cured at 140° C. for 2 hours resulting in a poor coverage of the glass plate.

(iii) Preparation of films from nylon-1 (a)

Nylon-1 (a) (12.3 grams) was mixed with a catalytic amount of dibutyltindilaureate and 2 grams of tri-functional amine-terminated poly(propylene oxide). The three components were thoroughly mixed and the mixture poured onto a glass plate and cured at 140° C. for 2 hours resulting in a poor film.

6. (i) Preparation of films from nylon-1 (b)

Nylon-1 (b) (5.56 grams) was mixed with a catalytic amount of dibutyltindilaureate and 4.6 grams of dodecafunctional OH-terminated poly(hexamethylene adipate). The three components were thoroughly mixed and the mixture poured onto a glass plate and cured at 140° C. for 2 hours resulting in a hard film.

(ii) Preparation of films from nylon-1 (b)

Nylon-1 (b) (9.2 grams) was mixed with a catalytic amount of dibutyltindilaureate and 10 grams of di-functional OH-terminated poly(hexamethylene adipate). The three components were thoroughly mixed and the mixture poured onto a glass plate and cured at 140° C. for 2 hours resulting in a clear, hard film.

(iii) Preparation of films from nylon-1 (b)

Nylon-1 (b) (10.3 grams) was mixed with a catalytic amount of dibutyltindilaureate and 3 grams of tri-functional amine-terminated poly(propylene oxide). The three components were thoroughly mixed and the mixture poured onto a glass plate and cured at 140° C. for 2 hours resulting in a leathery film.

(iv) Preparation of films from nylon-1 (b)

Nylon-1 (b) (100 grams) was mixed with a catalytic amount of dibutyltindilaureate and 115 grams of di-functional OH-terminated poly(hexamethylene adipate), 13 grams of a dodecafunctional OH-terminated poly(hexamethylene adipate) and 15 ml of toluene. The components were thoroughly mixed and the mixture poured onto a glass plate and cured at 140° C. for 2 hours resulting in a smooth, hard film.

7. (i) Preparation of films from nylon-1 (c)

Nylon-1 (c) (10 grams) was mixed with a catalytic amount of dibutyltindilaureate and 4 grams of dodecafunctional OH-terminated poly(hexamethylene adipate). The three components were thoroughly mixed and the mixture poured onto a glass plate and cured at 140° C. for 2 hours resulting in a hard film.

(ii) Preparation of films from nylon-1 (c)

Nylon-1 (c) (6.6 grams) was mixed with a catalytic amount of dibutyltindilaureate and 4 grams of di-functional OH-terminated poly(hexamethylene adipate). The three components were thoroughly mixed and the mixture poured onto a glass plate and cured at 140° C. for 2 hours resulting in a hard film.

(iii) Preparation of films from nylon-1 (c)

Nylon-1 (c) (12.3 grams) was mixed with a catalytic amount of dibutyltindilaureate and 2 grams of tri-functional amine-terminated poly(propylene oxide). The three components were thoroughly mixed and the mixture poured onto a glass plate and cured at 140° C. for 2 hours resulting in a leathery film.

8. Viscosity measurements (i) A composition in accordance with the invention

An about 10% NCO solution of HDI (500 g) in 2500 ml solvent (1625 ml xylene and 875 ml hexane) was prepared. The solution was placed under $N_2$ and 120 ml of the catalyst solution of Example 1 above was added over a period of about 8 hours with constant stirring. The residual NCO content was determined to be 1.62%. To this were added 275 ml of m-cresol. The final residual NCO content was determined to be 1.06%. The reaction mixture was allowed to settle and the supernatant was decanted off, leaving swollen gelatinous particles that were determined to be 50% solids.

(ii) A comparative example

A Ca 10% NCO solution of HDI (500 g) in 2500 ml solvent (1625 ml xylene and 875 ml hexane) was prepared. The solution was placed under $N_2$ and 120 ml of the catalyst solution of Example 1 above was added over a period of about 8 hours with constant stirring. The residual NCO content was determined to be 2.2%. The reaction mixture was allowed to settle and the supernatant was decanted off, leaving swollen gelatinous particles that were determined to be 50% solids.

The swollen nylons described above, 210 gm, each was mixed with 200 gm of a polyester (an 80% solution in butylacetate of the condensation product of adipic acid, isophthalic acid, phthalic anhydride, hexane diol and trimethylpropane, having an OH number of 112, acid number of 1.6 and an equivalent weight of 500). The mixture was ground up in an attritor (at 620 rpm using ⅛" ball bearings) for 6 hours, drawn down to 210 microns. The viscosities of the ground mixtures were then measured as function of time. The results (measured at a shear rate of 66 Hz) show that the viscosity of the unmodified system increase by 15% over the same period of time (7 days) that the modified system showed an increase of 4%. The greater increase in viscosity is indicative of the shorter pot life of the unmodified system.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a film comprising
   (A) reacting in an inert organic solvent a highly cross linked nylon-1 which is characterized in that at least 50% of its amide repeat units are cross-linking sites and which contains
   (I) structural units conforming to

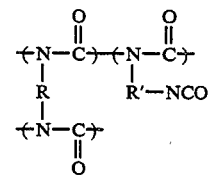

R and R' independently one of the other denote linear hydrocarbon groups, and
   (II) about 1 to 49% of unpolymerized NCO groups, with a monofunctional blocking agent to produce a first product which contains blocked NCO groups, and
   (B) reacting said first product with a compound containing two or more isocyanate-reactive functional groups to produce a second product, and
   (C) curing said second product
wherein said first product is reacted with said isocyanate-reactive compound such that the molar ratio of the total amide groups, blocked NCO groups and unpolymerized NCO groups to NCO-reactive groups is about 0.5:1 to 20:1.

2. The second product prepared in accordance with the process of claim 1.

3. The process of claim 1 wherein said blocking agent is selected from the group consisting of monophenols, tertiary alcohols, compounds which easily form enols, secondary aromatic amines, imides, lactams, oximes, mercaptans and triazoles.

4. The process of claim 1 wherein said isocyanate-reactive compound is amine terminated.

5. The process of claim 1 wherein ratio is about 0.8:1 to 5:1.

6. The process of claim 1 wherein reacting said first product with an isocyanate-reactive product to produce a second product is in the presence of a catalyst.

7. The process of claim 3 wherein blocking agent is selected from the group consisting of phenol, cresol, trimethyl phenol and tert.butyl phenols.

8. The process of claim 3 wherein said blocking agent is selected from the group consisting of tertiary butanol, tertiary amyl alcohol and dimethylphenyl carbonyl.

9. The process of claim 3 wherein said blocking agent is selected from the group consisting of acetoacetic ester, acetyl acetone and malonic acid derivatives.

10. The process of claim 3 wherein said blocking agent is selected from the group consisting of N-methylaniline, N-methyl toluidines, N-phenyl toluidine and N-phenyl xylidene.

11. The process of claim 3 Wherein said blocking agent is selected from the group consisting of methylmercaptan, ethyl mercaptan, butyl mercaptan, 2-mercapto-benzothiazole, α-naphthyl mercaptan, β-naphthyl mercaptan and dodecyl mercaptan.

12. The process of claim 3 wherein said blocking agent is selected from the group consisting of acetone oxime and ε-caprolactam.

13. The process of claim 1 wherein said isocyanate-reactive compound is an alcohol.

14. The process of claim 1 wherein said organic radical is a $C_{4-25}$ divalent hydrocarbon groups.

15. The process of claim 1 wherein said organic radical is selected from the group consisting of $C_{5-15}$ cycloaliphatic groups, $C_{7-15}$ araliphatic group and $C_{6-15}$ aromatic group.

16. The process of claim 1 wherein said isocyanate-reactive compound is polymeric.

17. The process of claim 1 wherein said isocyanate-reactive compound is monomeric.

18. The process of claim 1 wherein said isocyanate-reactive functional groups are selected from the group consisting of aliphatic hydroxy, phenol, aliphatic amine, aromatic amine, carboxylic anhydride, carboxylic acid, ketimine and diene.

* * * * *